(12) United States Patent
Hilliard

(10) Patent No.: US 11,129,390 B2
(45) Date of Patent: Sep. 28, 2021

(54) CHICKEN WING MEAT REMOVAL APPARATUS

(71) Applicant: Elvis Hilliard, Kalispell, MT (US)

(72) Inventor: Elvis Hilliard, Kalispell, MT (US)

( * ) Notice: Subject to any disclaimer, the term of this patent is extended or adjusted under 35 U.S.C. 154(b) by 11 days.

(21) Appl. No.: 16/748,251

(22) Filed: Jan. 21, 2020

(65) Prior Publication Data
US 2021/0219563 A1 Jul. 22, 2021

(51) Int. Cl.
*A22B 5/00* (2006.01)
*A22C 21/00* (2006.01)

(52) U.S. Cl.
CPC ........ *A22B 5/0047* (2013.01); *A22C 21/0076* (2013.01); *A22C 21/0084* (2013.01)

(58) Field of Classification Search
CPC .............. A22B 5/0047; A22C 21/0076; A22C 21/0084
USPC ...................... 452/135, 1–6, 12, 13, 102–105
See application file for complete search history.

(56) References Cited

U.S. PATENT DOCUMENTS

| | | | |
|---|---|---|---|
| 954,084 A | 4/1910 | Gelbman | |
| 2,793,392 A | 5/1957 | Cutrera | |
| 4,802,704 A | 2/1989 | Burns | |
| D356,240 S | 3/1995 | Meldahl | |
| 5,529,534 A * | 6/1996 | Adams | A22C 25/006 30/123.7 |
| 5,542,879 A | 8/1996 | Kunig | |
| 5,613,904 A * | 3/1997 | LaSalle | A22C 29/024 30/120.1 |
| 6,349,476 B1 | 2/2002 | Juranitch | |
| 7,287,791 B2 | 10/2007 | Carolina | |
| 8,382,562 B1 | 2/2013 | Lavretsky | |
| 9,161,548 B1 | 10/2015 | Spafford | |
| 2012/0190282 A1 * | 7/2012 | Rizzo | A22C 29/027 452/6 |

* cited by examiner

*Primary Examiner* — Richard T Price, Jr.

(57) ABSTRACT

A chicken wing meat removal apparatus for removing meat from chicken wings includes a planar tool body with a left end portion, a right end portion, and a body portion extending between the left end portion and the right end portion. The left end portion has a first left jaw and a second left jaw defining a left receiving area to receive a chicken wing. The first left jaw has a first left notch along a first left inner edge and the second left jaw has a second left notch along a second left inner edge. The right end portion has a first right jaw and a second right jaw defining a right receiving area to receive a chicken leg. The first right jaw has a first right notch along a first right inner edge.

8 Claims, 4 Drawing Sheets

CHICKEN WING MEAT REMOVAL APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to utensil devices and more particularly pertains to a new utensil device for removing meat from chicken wings.

(2) Description of Related Art Including Information Disclosed Under 37 CFR 1.97 and 1.98

The prior art relates to utensil devices for removing meat from bones, and in particular meat from chicken wings. Existing devices are often of more generic shape and not specifically designed to the bone structure of chicken. Existing devices may involve multiple components and may require more costly production, preventing them from being mass-produced, disposable utensils. Furthermore, existing devices do not offer dedicated ends for wings and legs (drumsticks).

BRIEF SUMMARY OF THE INVENTION

An embodiment of the disclosure meets the needs presented above by generally comprising a tool body comprising a top side, a bottom side, and an outer edge. The tool body is substantially planar and has a left end portion, a right end portion, and a body portion extending between the left end portion and the right end portion. The left end portion has a first left jaw and a second left jaw defining a left receiving area configured to receive a chicken wing. The first left jaw has a first left notch along a first left inner edge and the second left jaw has a second left notch along a second left inner edge. The right end portion has a first right jaw and a second right jaw defining a right receiving area configured to receive a chicken leg. The first right jaw has a first right notch along a first right inner edge.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
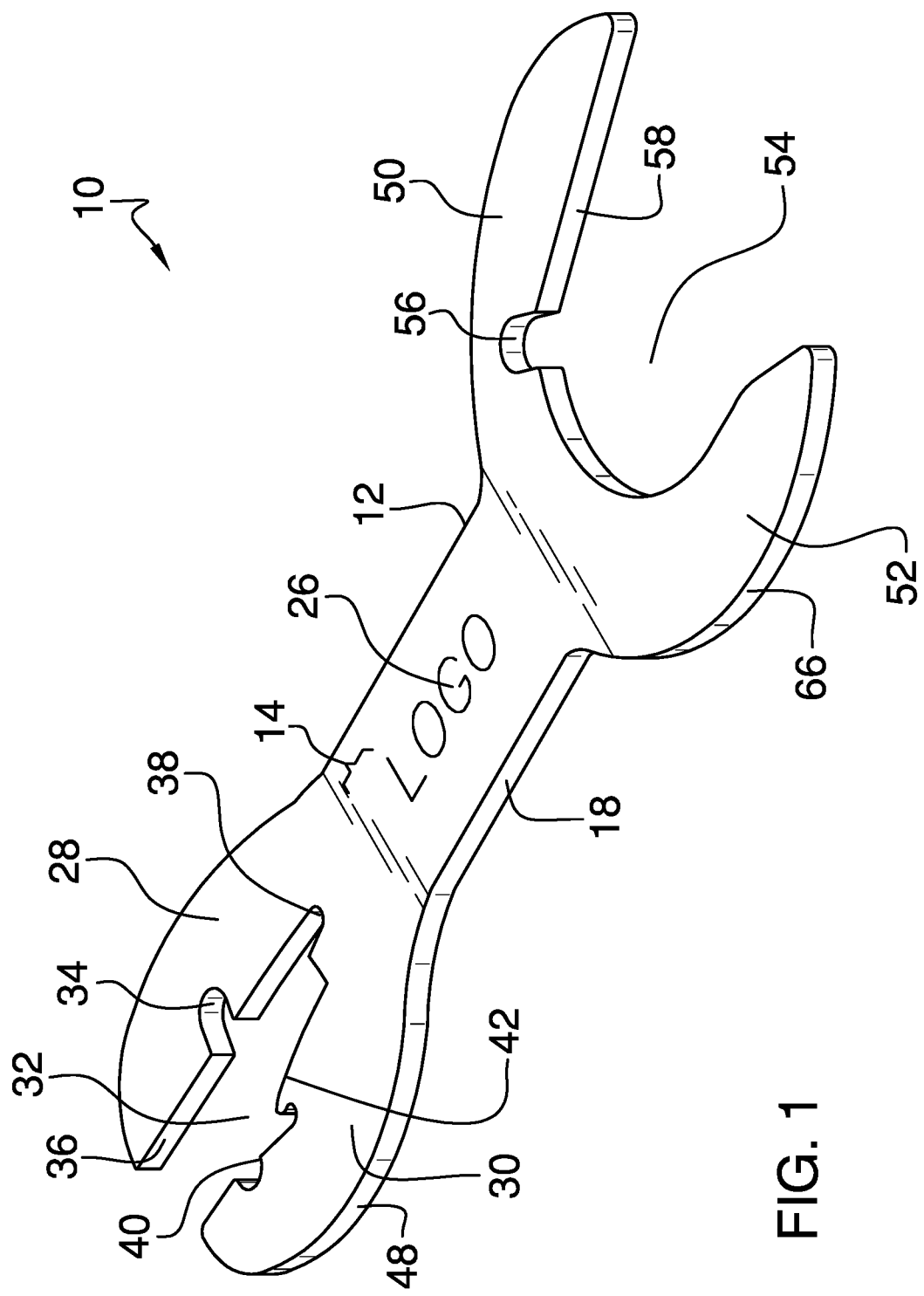
FIG. 1 is an isometric view of a chicken wing meat removal apparatus according to an embodiment of the disclosure.
Figure 2:
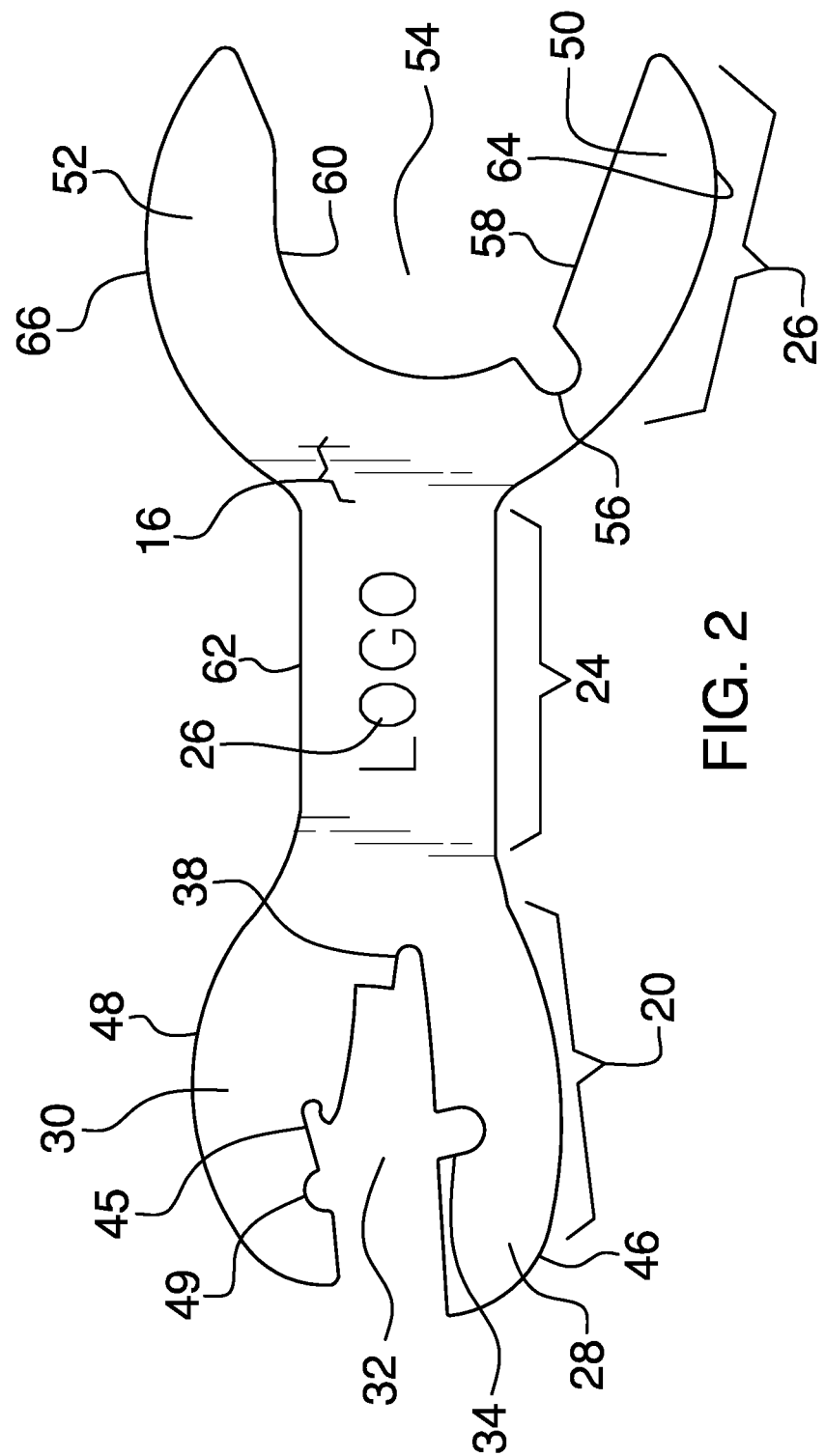
FIG. 2 is a bottom plan view of an embodiment of the disclosure.
Figure 3:
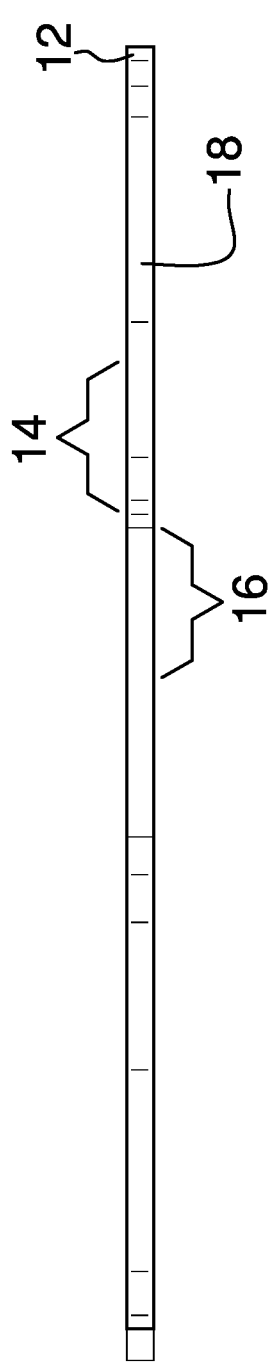
FIG. 3 is a side elevation view of an embodiment of the disclosure.
Figure 4:
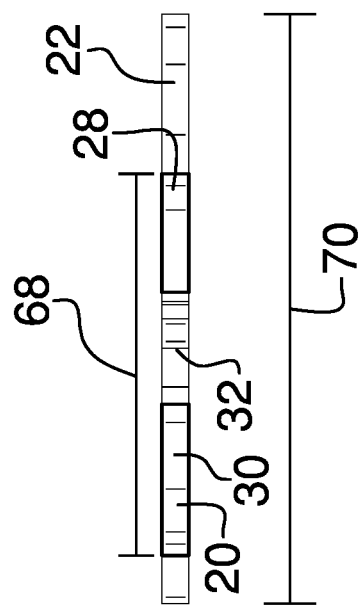
FIG. 4 is a front elevation view of an embodiment of the disclosure.
Figure 5:
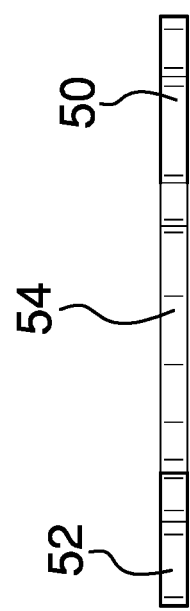
FIG. 5 is a rear elevation view of an embodiment of the disclosure.
Figure 6:
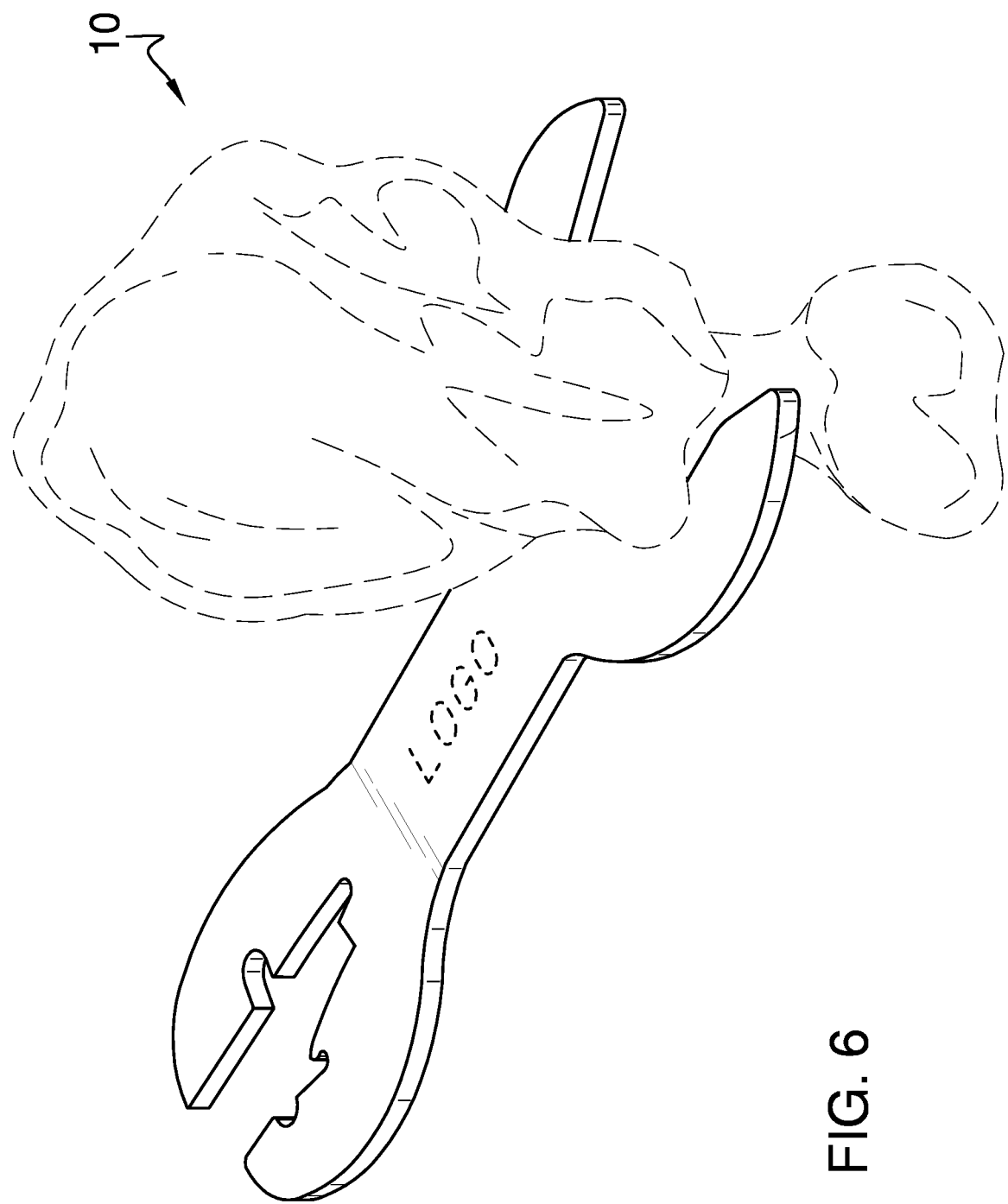
FIG. 6 is an elevational view of the tool being used on a chicken leg.

With reference now to the drawings, and in particular to FIGS. 1 through 5 thereof, a new utensil device embodying the principles and concepts of an embodiment of the disclosure and generally designated by the reference numeral 10 will be described.

As best illustrated in FIGS. 1 through 5, the chicken wing meat removal apparatus 10 generally comprises a tool body 12 comprising a top side 14, a bottom side 16, and an outer edge 18. The tool body 12 is substantially planar to improve ease of manufacturing and minimize cost to allow the apparatus 10 to be disposable. The apparatus 10 may be stamped or laser cut from sheet material. The tool body 12 has a left end portion 20, a right end portion 22, and a rectangular body portion 24 extending between the left end portion 20 and the right end portion 22. The rectangular body portion 24 may have wording or a logo 26 etched or printed onto the top side 14 and the bottom side 16.

The left end portion 20 has a first left jaw 28 and a second left jaw 30 defining a left receiving area 32 configured to receive a chicken wing. The first left jaw 28 has a first left notch 34 along a first left inner edge 36 and may have a corner notch 38 adjacent the body portion 24. The first left inner edge 36 may otherwise be linear and the first left notch 34 may be medially located on the first left inner edge 36. The second left jaw 30 has a second left notch 40 along a second left inner edge 42. The second left notch 40 may have a semicircular portion 44 and an elongated portion 45. The first left jaw 28 and the second left jaw 30 may have a rounded first left outer edge 46 and a rounded second left outer edge 48, respectively. A length of the first left jaw 28 may be longer than a length of the second left jaw 30.

The right end portion 22 has a first right jaw 50 and a second right jaw 52 define a right receiving area 54 configured to receive a chicken leg. The first right jaw 50 has a first right notch 56 along a first right inner edge 58. A second right inner edge 60 of the second right jaw 52 may be a circular arc. The first right notch 56 may be U-shaped and adjacent the second right inner edge 60. The remainder of the first right inner edge 58 may be linear and forms an angle of at least 30° with a body edge 62 of the body portion. The first right jaw 50 and the second right jaw 52 may have a rounded first right outer edge 64 and a rounded second right outer edge 66, respectively. A left width 68 between the first left outer edge 46 and the second left outer edge 48 may be less than a right width 70 between the first right outer edge 64 and the second right outer edge 66.

In use, the user secures the body portion 24 and utilizes the left end portion 20 on a chicken wing by placing the wing within the left receiving area 32 and positioning the bones within the first left notch 34, the corner notch 38, or the second left notch 40 and moving the apparatus 10 along the wing to remove the meet with the first left jaw 28 and the second left jaw 30. The user alternatively secures the body portion 24 and utilizes the right end portion 22 on a chicken leg by placing the leg within the right receiving area 54 and position the bone within the first right notch 56 and moving the apparatus 10 along the leg to remove the meet with the first right jaw 50 and the second right jaw 52.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A chicken wing meat removal apparatus comprising:
   a tool body comprising a top side, a bottom side, and an outer edge, the tool body being substantially planar and having a left end portion, a right end portion, and a body portion extending between the left end portion and the right end portion;
   the left end portion having a first left jaw and a second left jaw defining a left receiving area configured to receive a chicken wing, the first left jaw having a first left notch along a first left inner edge, the second left jaw having a second left notch along a second left inner edge; and
   the right end portion having a first right jaw and a second right jaw defining a right receiving area configured to receive a chicken leg, the first right jaw having a first right notch along a first right inner edge.

2. The chicken wing meat removal apparatus of claim 1 further comprising the first left jaw and the second left jaw having a rounded first left outer edge and a rounded second left outer edge, respectively, the first right jaw and the second right jaw having a rounded first right outer edge and a rounded second right outer edge, respectively, a left width between the first left outer edge and the second left outer edge being less than a right width between the first right outer edge and the second right outer edge.

3. The chicken wing meat removal apparatus of claim 1 further comprising a second right inner edge of the second right jaw being a circular arc.

4. The chicken wing meat removal apparatus of claim 3 further comprising the first right notch being U-shaped and adjacent the second right inner edge, the remainder of the first right inner edge being linear.

5. The chicken wing meat removal apparatus of claim 4 further comprising the body portion being rectangular, the first right inner edge forming an angle of at least 30° with a body edge of the body portion.

6. The chicken wing meat removal apparatus of claim 1 further comprising the second left notch having a semicircular portion and an elongated portion.

7. The chicken wing meat removal apparatus of claim 1 further comprising the first left inner edge having a corner notch adjacent the body portion.

8. A chicken wing meat removal apparatus comprising:
   a tool body comprising a top side, a bottom side, and an outer edge, the tool body being substantially planar and having a left end portion, a right end portion, and a rectangular body portion extending between the left end portion and the right end portion;
   the left end portion having a first left jaw and a second left jaw defining a left receiving area configured to receive a chicken wing, the first left jaw having a first left notch along a first left inner edge and a corner notch adjacent the body portion, the second left jaw having a second left notch along a second left inner edge, the second left notch having a semicircular portion and an elongated portion, the first left jaw and the second left jaw having a rounded first left outer edge and a rounded second left outer edge, respectively; and
   the right end portion having a first right jaw and a second right jaw defining a right receiving area configured to receive a chicken leg, the first right jaw having a first right notch along a first right inner edge, a second right inner edge of the second right jaw being a circular arc, the first right notch being U-shaped and adjacent the second right inner edge, the remainder of the first right inner edge being linear and forming an angle of at least 30° with a body edge of the body portion, the first right jaw and the second right jaw having a rounded first right outer edge and a rounded second right outer edge, respectively, a left width between the first left outer edge and the second left outer edge being less than a right width between the first right outer edge and the second right outer edge.

* * * * *